United States Patent [19]
Babjak et al.

[11] Patent Number: 5,516,820
[45] Date of Patent: May 14, 1996

[54] AUTOMOTIVE COATINGS FROM NON-AQUEOUS DISPERSIONS

[76] Inventors: John R. Babjak, 8454 W. Currant Ave., Tinley Park, Ill. 60477; Liza A. Capino, 12250 Spencer, Alsip, Ill. 60658; John D. Kraan, 8957 S. Komensky, Hometown, Ill. 60456; Mohamad D. Shalati, 17955 Los Angeles Ave., Homewood, Ill. 60430; Susan L. Smith, 3507 Timberbridge #D, Valparaiso, Ind. 46383; Demetri L. Vallion, 14446 S. Torrance, Apt. 1C, Burnham, Ill. 60633; Richard S. Valpey, 542 Johnson Ave., Frankfort, Ill. 60423; Thomas W. Yokoyama, 512 W. Barry-Apt. 212, Chicago, Ill. 60657

[21] Appl. No.: 478,120

[22] Filed: Jun. 7, 1995

Related U.S. Application Data

[62] Division of Ser. No. 372,265, Jan. 13, 1995.

[51] Int. Cl.⁶ .............................. C08L 67/08; C08L 67/06

[52] U.S. Cl. .................... 523/523; 523/500; 523/526; 526/216

[58] Field of Search ..................... 523/500, 523, 523/526; 524/539; 526/216

[56] References Cited

U.S. PATENT DOCUMENTS

| 4,983,716 | 1/1991 | Rao et al. | 523/523 |
| 5,340,871 | 8/1994 | Pearson et al. | 523/526 |
| 5,348,992 | 9/1994 | Pearson et al. | 523/523 |

FOREIGN PATENT DOCUMENTS

| 0086845 | 7/1980 | Japan | 523/500 |

*Primary Examiner*—Peter A. Szekely
*Attorney, Agent, or Firm*—Steven W. Tan; Robert E. McDonald; Heidi A. Boehlefed

[57] ABSTRACT

Novel, non-aqueous dispersions and coatings made therefrom particularly suited for use as automotive primers, sealers, topcoats and as industrial coatings.

26 Claims, No Drawings

AUTOMOTIVE COATINGS FROM NON-AQUEOUS DISPERSIONS

This is a divisional of application Ser. No. 08/372,265 filed on Jan. 13, 1995.

BACKGROUND OF THE INVENTION

The automotive industry has been trying for years to develop lower volatile organic content (VOC) coatings without sacrificing performance in areas such as durability, gloss retention, solvent and humidity resistance and the like.

The present invention produces a low VOC coating composition which is particularly well-suited for use as an automotive enamel coating or as a coating for industrial applications. This invention relates to lower VOC, non-aqueous dispersions (NAD's) comprising an acrylic polymer stabilized in an alkyd steric stabilizer. The NAD's of this invention are particularly useful in automotive applications as one and two component primers, sealers and topcoat enamels and in industrial applications as coatings for equipment, parts and the like.

For purposes of this invention, NAD's are polymeric particles having a core-shell type morphology dispersed in a non-polar solvent such as a hydrocarbon. The "core" is comprised of a polar copolymer produced by a free-radical addition reaction and the "shell" comprises an alkyd resin or an acrylic/alkyd copolymer. A large portion of the shell resin is soluble in the hydrocarbon solvent and thus forms the continuous phase. However, a small portion of the shell resin is adsorbed onto the surface of the core polymer particles and acts as a steric stabilizer for those dispersed particles.

SUMMARY OF THE INVENTION

The present invention relates to a non-aqueous dispersion which is especially suited for use as an automotive enamel coating. The non-aqueous dispersion of this invention comprises polymeric particles having a core-shell type morphology dispersed in a non-polar solvent such as a hydrocarbon. The "core" is comprised of a polar copolymer produced by a free-radical addition reaction and the "shell" comprises an alkyd resin or an acrylic/alkyd copolymer. A large portion of the shell resin is soluble in the hydrocarbon solvent and thus forms the continuous phase. However, a small portion of the shell resin is adsorbed onto the surface of the core polymer particles and acts as a steric stabilizer for those particles.

The polymer portion of the NAD produced by the free-radical addition reaction can be comprised of either hard monomers like methyl methacrylate or soft monomers like ethyl acrylate. However, it is essential that two type of monomers, (i) a polar monomer such as hydroxyethyl acrylate, and (ii) an amine-functional monomer, are included. The alkyd is preferably a long oil alkyd having some hydroxy-functionality. The total solids content of the NAD is preferably greater than about 70% by weight.

A preferred non-aqueous dispersion comprises a ratio of about 90:10 to about 10:90 core resin:alkyd resin, more preferably a ratio of about 60:40 core resin:alkyd resin in non-polar hydrocarbon solvent. Preferably from between about 2% to about 10% by weight of the resin produced by the free-radical addition reaction is comprised of an amine-functional acrylic monomer selected from the group consisting of dimethylaminoethyl acrylate, dimethylaminoethyl methacrylate, dimethylaminoethyl acrylamide, dimethylaminoethyl methacrylamide, n-t-butylaminoethyl acrylate, n-t-butylaminoethyl methacrylate, monomers resulting from the reaction of dialkyl amines with glycidyl methacrylate, and mixtures thereof. Also, preferably, from between about 5% to about 40% by weight, more preferably from between about 10% to about 30% by weight of the resin produced by the free-radical addition reaction is comprised of a polar monomer selected from the group consisting of acrylonitrile, methacrylonitrile, acrylamide, methacrylamide, hydroxyethyl methacrylate, hydroxyethyl acrylate, hydroxypropyl acrylate, hydroxypropyl methacrylate, 4-hydroxy butyl acrylate, 4-hydroxy butyl methacrylate, polyethyleneoxide hydroxyethyl acrylate, adducts of hydroxyethyl acrylate and caprolactone, mixtures thereof, and the like. The glass transition temperature (Tg) of the acrylic resin should be between about −22 degrees C. and about 105 degrees C., preferably between about 10 degrees C. and about 70 degrees C. Chain transfer agents and free-radical initiators common to the acrylic polymerization industry can be useful and will be described in more detail below.

The alkyd portion of the NAD is preferably relatively high in hydroxy value, generally having a hydroxy number between about 10 and about 150, preferably between about 30 and about 50. The alkyd is also preferably relatively low in molecular weight, preferably having an Mn of between about 2000 and about 4000, with a polydispersity generally less than 10, preferably between about 3 and about 10. The acid value of the alkyd should be in the range of about 5 to about 20, oil length should be greater than about 30% but generally less than about 70% and viscosity of the alkyd measured at 25 degrees C., 70% solids by weight in 50-flash naphtha should be less than about 50 poise, preferably less than about 10 poise.

As one-component coatings, the NAD's of this invention can be cured autooxidatively with the assistance of typical transition metal driers such as those based on cobalt and manganese. As two-component coatings, the NAD's of this invention, in addition to autooxidative cure, can be crosslinked with isocyanate-functional materials by reacting the hydroxy groups of the alkyd with the NCO groups of the isocyanate and the surface hydroxy groups of the acrylic core.

Accordingly, it is an object of this invention to teach lower VOC non-aqueous dispersions having particular suitability for use as automotive and industrial coatings.

It is a further object of this invention to teach one and two component coating compositions containing the non-aqueous dispersions of this invention.

These and other objects and benefits will become more apparent from the detailed description and examples which follow below.

DETAILED DESCRIPTION OF THE INVENTION

General Considerations

As stated above, the present invention relates to a non-aqueous dispersion which is especially suited for use as an automotive enamel coating. The non-aqueous dispersion of this invention comprises polymeric particles having a core-shell type morphology dispersed in a non-polar solvent such as a hydrocarbon. The "core" is comprised of a polar copolymer produced by a free-radical addition reaction and the "shell" comprises an alkyd resin or an acrylic/alkyd copolymer. A large portion of the shell resin is soluble in the hydrocarbon solvent and thus forms the continuous phase. However, a small portion of the shell resin is adsorbed onto the surface of the core polymer particles and acts as a steric stabilizer for those particles.

The portion of the NAD produced by the free-radical addition reaction can be comprised of either hard monomers like methyl methacrylate or soft monomers like ethyl acrylate. However, it is essential that two monomers, (i) a polar monomer such as hydroxyethyl acrylate, and (ii) an amine-functional monomer, are included. The alkyd is preferably a long oil alkyd having some hydroxy-functionality. The total solids content of the NAD is preferably greater than about 70% by weight.

A preferred non-aqueous dispersion comprises a ratio of about 90:10 to about 10:90 core resin:alkyd resin, more preferably a ratio of about 60:40 core resin:alkyd resin in non-polar hydrocarbon solvent. Preferably from between about 2% to about 10% by weight of the core resin is comprised of an amine-functional monomer, preferably a tertiary amine or a hindered secondary amine, selected from the group consisting of dimethylaminoethyl acrylate, dimethylaminoethyl methacrylate, dimethylaminoethyl acrylamide, dimethylaminoethyl methacrylamide, n-t-butylaminoethyl acrylate, n-t-butylaminoethyl methacrylate, monomers resulting from the reaction of dialkyl amines with glycidyl methacrylate, and mixtures thereof. Also, preferably, from between about 5% to about 40%, more preferably from between about 10% to about 30% by weight of the core resin is comprised of a polar monomer selected from the group consisting of acrylonitrile, methacrylonitrile, acrylamide, methacrylamide, hydroxyethyl methacrylate, hydroxyethyl acrylate, hydroxypropyl acrylate, hydroxypropyl methacrylate, 4-hydroxy butyl acrylate, 4-hydroxy butyl methacrylate, polyethyleneoxide hydroxyethyl acrylate, adducts of hydroxyethyl acrylate and caprolactone, mixtures thereof, and the like. The glass transition temperature (Tg) of the core resin should be between about −22 degrees C. and about 105 degrees C., preferably between about 10 degrees C. and about 70 degrees C. Chain transfer agents and free-radical initiators common to the free-radical addition polymerization industry can be useful.

The alkyd portion of the NAD is preferably relatively high in hydroxy value, generally having a hydroxy number between about 10 and about 150, preferably between about 30 and about 50. The alkyd is also preferably relatively low in molecular weight, preferably having an Mn of between about 2000 and about 4000, with a polydispersity generally less than 10, preferably between about 3 and about 10. The acid value of the alkyd should be in the range of about 5 to about 20, oil length should be greater than about 30% but generally less than about 70% and viscosity of the alkyd measured at 25 degrees C, 70% solids by weight in 50-flash naphtha should be less than about 50 poise, preferably less than about 10 poise.

As one-component coatings, the NAD's of this invention can be cured autooxidatively with the assistance of a drier composition, preferably a composition comprising transition metal driers. As two-component coatings, the NAD's of this invention, in addition to autooxidative cure, can be crosslinked with isocyanate-functional materials by reacting the hydroxy groups of the alkyd with the NCO groups of the isocyanate and the surface hydroxy groups of the core polymer core.

The NAD's of this invention can be used as the sole film-forming resin of the coating or they can be admixed with other resins, particularly with the alkyd resin used to make the NAD, as part of an overall resin system. They are particularly useful as primers, sealers, enamels and basecoats in automotive applications and as primers and enamels in industrial applications. In a substrate coated with a multilayer decorative and/or protective coating which comprises a basecoat comprising a pigmented film-forming resin, and a clearcoat comprising a film-forming resin applied to the surface of the basecoat composition, the NAD's of the present invention can be used as basecoats. This invention represents an improvement comprising utilizing as the basecoat composition the non-aqueous dispersion comprising a dispersion of a polymer in a non-polar hydrocarbon medium, wherein the polymer is produced by a free-radical addition polymerization reaction which takes place in the presence of an alkyd resin and wherein the polymer comprises at least one polar monomer and at least one amine-functional monomer. The basecoats can be clearcoated with clearcoats known in the industry, preferably those which are acrylic urethane clearcoats.

Production Considerations

Processing conditions play a large role in the preparation of the dispersions of this invention. The method of making the non-aqueous dispersions of this invention involves the addition of monomers capable of undergoing free-radical addition polymerization and alkyd resin to a solution of alkyd and solvent in a suitable reactor. Free radical initiator is added simultaneously as described below. Processing of the NAD requires careful control of the particle size and polydispersity of the resulting resin. Generally, smaller particle size resins have good coatings properties but poor VOC and viscosity. On the other hand, larger particle size resins generally have lower viscosity and higher solids but poor shelf stability and coatings properties. We have found that the particle size of the dispersed particle (Dz) should be maintained in the range of about 100 nm to about 700 nm, preferably between about 250 nm and about 400 nm. The particle size is controlled by the amount of alkyd added initially to the reactor, the amount and type of initiator used, and by the mode of addition for the initiator.

In general, the free-radical addition polymerization monomers are soluble in the hydrocarbon resin but the polymer which results from the free radical addition reaction is not. Consequently, a stabilization agent is required to prevent precipitation of the polymer. The alkyd acts as the stabilization agent by either physical adsorption of the alkyd onto the surface of the polymer or by the creation of a graft copolymer between the alkyd and the polymer which shows affinity for both the dispersed particle and the hydrocarbon media. When a graft copolymer is created between the alkyd and the polymer, the polar portion of the graft copolymer (the free-radical addition portion) associates itself with the dispersed polymer whereas the non-polar portion of the graft copolymer (the alkyd portion) associates itself with the continuous media, i.e. the hydrocarbon solvent.

We have found that the amount of alkyd charged to the reactor plays a significant role in the particle size of the final product. The first step in the polymerization reaction is the nucleation step. This is where small nuclei are formed and which eventually grow in size. The larger the number of nuclei formed initially, the smaller the average final particle size of the dispersed phase of the NAD. There are two factors which dominate the formation of nuclei: (i) the amount of initial alkyd charged to the reactor, and (ii) the initiator concentration used. The longer the residence time of the alkyd in the reactor, the more likely that nuclei will be formed and therefore the more likely that a graft copolymer will be formed. The higher the amount of initiator used, the more dispersed molecules formed, and consequently, the more likely that graft copolymers could be made.

We have found that either peroxide or azo-type initiator compounds can be used in the present invention. In either case, the concentration of initiator should be less than about 5% by weight (based upon the weight of flee-radical addition monomers in the reactor) should be used. Preferably, the amount of initiator is less than about 1% on the same basis, more preferably, between about 0.1% and about 0.3%. The peroxide initiators are preferred over the azo-type initiators due to their ability to form graft copolymers more readily than azo compounds. Alkyl percarboxylates such as t-butyl peroctoate are preferred.

Reaction temperature is dependent upon the initiator used. It is preferred to keep the reaction temperature at a level which corresponds to about 1 to about 30 minutes half-life time of the initiator. For peroxide initiators, the reaction temperature should be between about 100 degrees C. and about 130 degrees C. For azo initiators, the reaction temperature should be between about 80 degrees C. and about 100 degrees C.

A high rate of solution agitation is important in the reactor. This ensures good mass transfer and thus a reproducible product of consistent particle size.

As stated above, the initial initiator concentration and the feed rate of the initiator are important. We have found that either adding the initiator at a constant rate over the duration of the monomer feed or that gradually increasing the amount of initiator added over the duration of the monomer feed leads to very consistent results in both particle size and polydispersity. When adding the initiator at a constant rate over the duration of the polymerization reaction, the amount of initiator used is generally between about 0.05% and 2.0% by weight of total monomers, preferably between about 0.1% and about 0.7%, most preferably less than about 0.3%. The amount added during the initial hour of the polymerization reaction appears to most affect the final particle size of the polymer. In a preferred constant feed embodiment, between about 0.40% and 0.50% of the total initiator is added each minute of the polymerization reaction.

When adding the initiator at a gradually increasing rate over the duration of the monomer feed, the amount of initiator used initially is generally about 10% to 20% less than the amount used if feeding the initiator at a constant rate. The amount is gradually increased and by the end of the monomer feed the amount of initiator is generally about 10% to about 20% greater than the amount used if feeding the initiator at a constant rate. The examples below show both methods of initiator concentration and feed rates.

It is important to follow the monomer feed and initiator feed with a "chaser" solution of initiator to react as much remaining free monomer as possible. Generally, between about 0.2% and about 3.0% by weight of total monomer is used as a chaser and is added over a 1 to 3 hour period. Again, the examples below demonstrate this principle.

Free Radical Addition Monomer Considerations

The portion of the NAD produced by the flee-radical addition reaction can be comprised of either hard monomers like methyl methacrylate or soft monomers like ethyl acrylate. Generally, the monomers are selected from the group consisting of acrylonitrile, methacrylonitrile, acrylic acid, methacrylic acid, itaconic acid, and esters of those acids, especially hydroxyethyl acrylate and methacrylate, hydroxypropyl acrylate and methacrylate, methyl acrylate and methacrylate, ethyl acrylate and methacrylate, butyl acrylate and methacrylate, lauryl acrylate and methacrylate, t-butyl methacrylate, isobornyl methacrylate, and the like, acrylamide, methacrylamide, vinyl chloride, vinylidene chloride, styrene, divinyl benzene, vinyl toluene, vinyle naphthalene, multifunctional epoxides, melamines and isocyanates, and mixtures thereof. However, it is essential that two types of monomers, (i) a polar monomer such as hydroxyethyl acrylate, and (ii) an amine-functional monomer, are included. Preferably from between about 2% to about 10% by weight of the free-radical addition polymer resin is comprised of a tertiary or hindered secondary amine-functional acrylic monomer selected from the group consisting of dimethylaminoethyl acrylate, dimethylaminoethyl methacrylate, dimethylaminoethyl acrylamide, dimethylaminoethyl methacrylamide, n-t-butylaminoethyl acrylate, n-t-butylaminoethyl methacrylate, monomers resulting from the reaction of dialkyl amines with glycidyl methacrylate, and mixtures thereof. Also, preferably, from between about 5% to about 40%, preferably between about 10% and about 30%, by weight of the resin is comprised of a polar monomer selected from the group consisting of acrylonitrile, methacrylonitrile, acrylamide, methacrylamide, hydroxyethyl methacrylate, hydroxyethyl acrylate, hydroxypropyl acrylate, hydroxypropyl methacrylate, 4-hydroxy butyl acrylate, 4-hydroxy butyl methacrylate, polyethyleneoxide hydroxyethyl acrylate, adducts of hydroxyethyl acrylate and caprolactone, mixtures thereof, and the like.

The glass transition temperature (Tg) of the acrylic resin should be between about −22 degrees C. and about 105 degrees C., preferably between about 10 degrees C. and about 70 degrees C.

Chain transfer agents such as dodecyl mercaptan and 2-mercaptoethanol, mixtures thereof and the like can be useful. If used, the percentage of chain transfer agent (by weight based upon the weight of the acrylic) is generally less than about 2%, preferably less than about 1%.

One particularly preferred monomer composition is the combination of methyl methacrylate, hydroxyethyl acrylate and dimethylaminoethyl acrylate. In this preferred embodiment, the monomer mix is from about 60 to about 75 parts methyl methacrylate, about 20 to about 30 parts hydroxyethyl acrylate and about 2 to about 6 parts dimethylaminoethyl acrylate.

One factor critical to the success of making a one or two component coating suitable for use as an automotive primer, sealer or enamel is the inclusion of an amine-functional acrylic monomer in the free-radical addition monomer mixture. The inclusion of this monomer in a coating intended for use as a primer/sealer gives the coating excellent corrosion resistance properties and enables the coating to resist solvents such as methyl ethyl ketone, maintain gloss, and resist water spotting much better than a primer/sealer formulated without the amine-functional monomer. Likewise, the inclusion of this monomer in a coating intended for use as an automotive or industrial topcoat enamel enables the coating to resist solvents such as methyl ethyl ketone and resist yellowing better than similar formulas without the amine-functional monomer. Lastly, we have found that the inclusion of the amine-functional monomer significantly reduces the viscosity increase found in some two-component coatings.

Without wishing to be bound by theory, we believe that the amine-functional monomer provides several tangible benefits. First, the amine-functional monomer encourages the formation of crosslinked core particles that tend to form better packed films, and thus, exhibit improved corrosion resistance. Second, the amine-functional monomer may act as a co-catalyst for the hydroxy/isocyanate reaction. Third, the inclusion of the amine-functional monomer, through salt formation with carboxylic acid, results in better film forming properties. Lastly, the amine-functional monomer, when used on iron substrates, is believed to donate its lone pair electrons to the d-orbital of the iron substrate which results in better adhesion of the film to the substrate.

Alkyd Resin Considerations

The alkyd acts as the stabilization agent by either physical adsorption of the alkyd onto the surface of the dispersed polymer or by the creation of a graft copolymer between the alkyd and the core polymer which shows affinity for both the dispersed particle and the hydrocarbon media. A small amount of graft copolymer is created between the alkyd and the core polymer. The polar portion of the graft copolymer (the core polymer portion) associates itself with the dispersed polymer whereas the non-polar portion of the graft copolymer (the alkyd portion) associates itself with the continuous media.

The alkyd is preferably a long oil alkyd having some hydroxy-functionality. The alkyd portion of the NAD is preferably relatively high in hydroxy value, generally having a hydroxy number between about 10 and about 150, preferably between about 30 and about 50. The alkyd is also preferably relatively low in molecular weight, preferably having an Mn of between about 2000 and about 4000, with a polydispersity generally less than 10, preferably between about 3 and about 10. The acid value of the alkyd should be in the range of about 5 to about 20. The oil length should be greater than about 30% but generally less than about 70% and viscosity of the alkyd measured at 25 degrees C. and 70% solids by weight in 50-flash naphtha, should be less than about 50 poise, preferably less than about 10 poise.

The alkyds useful in this invention can be made by any of the means known in the industry including fatty acid esterification, alcoholysis of a drying oil followed by further reaction with a di- or tri-basic acid or anhydride or acidolysis of a drying oil followed by further reaction with a multi-functional alcohol. The means used for production of the alkyd is not important provided that the alkyd has the physical properties described above.

If following either the alcoholysis or acidolysis-type reactions, the oil used in the formation of the alkyd is typically a triglyceride oil selected from the group consisting of linseed oil, soya oil, coconut oil, cottonseed oil, peanut oil, canola oil, corn oil, safflower oil, sunflower oil, dehydrated castor oil, tung oil, tall oil and the like. Preferred are those oils containing unsaturation in the glyceride chains. Particularly preferred are soya oil, dehydrated castor oil and linseed oil.

In a typical alcoholysis-type reaction, the triglyceride oil is first reacted with a multi functional alcohol generally selected from the group consisting of trimethylol propane, trimethylol ethane, glycerine, tris hydroxyethyl isocyanurate, pentaerythritol, dipentaerythritol, ethylene glycol, propylene glycol, cyclohexane dimethanol, dimethylol propionic acid, mixtures thereof and the like. If desired, a small portion of monofunctional alcohol can be added for molecular weight control. The intermediate from the alcoholysis step is then further reacted with an acid or anhydride generally selected from the group consisting of trimelletic acid or anhydride, isophthalic acid, terephthalic acid, trimesic acid, 1,3,5-pentane tricarboxylic acid, maleic anhydride, phthalic anhydride, citric acid, pyromelletic anhydride, and mixtures thereof. Again, a small percentage of monofunctional acid such as crotonic acid, soya fatty acid or linseed fatty acid can be added to control molecular weight.

One preferred alkyd comprises the reaction product of soya oil with pentaerythritol in the presence of lithium hydroxide monohydrate followed by further reaction with a mixture of maleic anhydride and phthalic anhydride in xylene. The procedure for making such an alkyd is shown in Example I, below.

One and Two Component Coatings

As stated above, when formulated as one-component coatings, the NAD's of this invention can be cured autooxidatively with the assistance of a drier composition. Drier compositions are well-known in the coatings industry and are generally comprised of alkaline earth, rare earth, and transition metals. Preferred drier compositions comprise transition metal driers such as those based on cobalt, manganese, zirconium, aluminum, lead, iron, zinc, copper and nickel. When formulated as two-component coatings, the NAD's of this invention, in addition to autooxidative cure, can be crosslinked with a second, separately packed component comprising isocyanate-functional materials. The isocyanate-functional materials crosslink the NAD's of this invention through reaction of the hydroxy groups of the alkyd with the NCO groups of the isocyanate and the surface hydroxy groups of the core.

As either one, or two-component systems, the coatings of this invention can also be baked dry using procedures and temperatures well-known in the industry.

Representative isocyanate-functional materials include, but are not limited to, the polymeric and/or oligomeric isocyanurate trimers and dimers, biurets, and allophanates of diisocyanates selected from the group consisting of trimethylene diisocyanate; tetramethylene diisocyanate; pentamethylene diisocyanate; hexamethylene diisocyanate; ethylethylene diisocyanate; 2,3-dimethylethylene diisocyanate; 1-methyltrimethylene diisocyanate; 1,3-cylcopentylene diisocyanate; 1,4-cyclohexylene diisocyanate; 1,2-cyclohexylene diisocyanate; 1,3-phenylene diisocyanate; 1,4-phenylene diisocyanate; 2,4-toluylene diisocyanate; 2,6-toluylene diisocyanate; 4,4'-biphenylene diisocyanate; 1,5-naphthylene diisocyanate; 1,4-naphthylene diisocyanate; 1-isocyanatomethyl-5-isocyanato-1,3,3 -trimethylcyclohexane; bis-( 4-isocyanato-cyclohexyl)-methane; bis-(4-isocyanato-phenyl)-methane; 4,4'-diisocyanatodiphenyl ether; 2,3-bis-(8-isocyanatooctyl)-4-octyl-5-hexylcyclohexane; isophorone diisocyanate; benzene-1,3-bis (1-isocyanato-1-methylethyl)); and mixtures thereof.

Particularly preferred are the isocyanurate trimers of isophorone diisocyanates and the allophanates of any of the above described diisocyanates.

The reaction between the isocyanate-functional material and the hydroxy groups of the dispersion generally requires the assistance of a catalyst, preferably a tin catalyst such as dibutyl tin dilaurate.

The following examples will illustrate several embodiments of the composition, preparation and advantages of the present invention. These examples are not intended to limit the scope of the invention.

EXAMPLE 1

Sample Alkyd Preparation

In a 60 gallon stainless steel reactor equipped with mechanical stirrer, condenser, decanter, oil-heating coil, nitrogen inlet/outlet, the following ingredients were charged:

157.33 lbs of soya oil 47.78 bls of pentaerythritol 0.0614 lbs of lithium hydroxide monohydrate Under nitrogen blanket, the mixture was stirred and heated to 480 degrees F. over a 70 minute period and held at this temperature until it gave a clear hot solution with either molten phthalic anhydride or methanol. The reaction mixture was cooled to 400 degrees F. and the following materials were added:

69.56 lbs of soya oil 1.68 lbs of maleic anhydride 81.90 lbs of phthalic anhydride 14.33 lbs of xylene The temperature was dropped to 320 degrees F. when the above addition was completed. Heating was resumed and the temperature was increased gradually to 450 degrees F. over 6 hours. During this time water was collected in the decanter. Heating was maintained for about 1.5 hours until the acid value of the alkyd reached about 11 mg KOH/g resin. The temperature was reduced to 240 degrees F. by cooling and 122 lbs of 50-flash naphtha was added. The alkyd solution was filtered through a 25 micron bag and packaged. The properties of the alkyd were:

Gardener-Holt viscosity: V-W

Brookfield viscosity: 13 poise

Acid Value: 12.4

Non-volatile mat'ls: 71% density: 7.97 lbs/gal

Mn: 2800 (standard:polystyrene)

Mz: 46,000

Pd: 4.3

EXAMPLE 2

General Procedure for the Preparation of Preferred NAD

To a clean and dry reactor (glass or stainless steel), equipped with mechanical stirrer, condensor, metering pumps, nitrogen inlet and outlet, heating and cooling devices, charge the following materials under nitrogen blanket:

145.3 parts of 50 flash-naphtha 87.3 parts of base alkyd (from Example 1)

Prepare the following charge in the monomer mix reservoir:

349.6 parts of base alkyd (from Example 1)

114.6 parts of hydroxyethyl acrylate 316.6 parts of methyl methacrylate 27.5 parts of dimethylaminoethyl acrylate 3.22 parts of 2-mercaptoethanol In the initiator tank, mix the following ingredients:

0.92 parts t-butylperoctoate 236.00 parts VM&P 50 flash-naphtha

Heat reaction mixture to 230° F. under nitrogen blanket with 210 rpm agitation (tip speed=2000 inch/minute). Add the monomer mixture at a constant rate over 3 hrs period (4.51 part/minute). Add the initiator mixture at 0.118 part/minute or 0.48%/minute during the first hour, at 0.13 part/minute or 0.53%/minute during the second hour and at 0.16 part/minute or 0.65%/minute during the third hour. At the end of addition, wash the monomer line with 123 parts of VM&P 50 flash-naphtha. Hold for 15 minutes and cool to 200° F. Then add the following chaser charge at a rate of 0.134 part/minute for four minutes:

4.58 parts of Vazo-67

12.3 parts of xylene 2.3 parts of t-butylperoctoate

Hold for 15 minutes, then resume the addition for five more minutes and hold for 10 minutes. Continue the addition of initiator mixture for 134 minutes. During the chaser addition, allow the temperature to rise from 200° F. to 230° F., gradually. Hold for 30 minutes. Cool to 100° F. filter into 25 micron bags and packaged. The resultant NAD has the following characteristics: Brookfield Viscosity at 5&100 rpm with #4 spindle: 600 & 388 cps.; particle size (Malvern Zetasizer instrument): Dz=330 nm; %NVM=69.8; density= 8.35 lbs./gal.

EXAMPLE 3

To a clear and dry reactor (glass or stainless steel), equipped with mechanical stirrer, condensor, metering pumps, nitrogen inlet and outlet, heater and cooling devices, charge the following materials under nitrogen blanket:

265.0 parts of VM&P 50 flash-naphtha 160.0 parts of base alkyd (from Example 1)

Prepare the following charge in the monomer mix tank:

640.0 parts of base alkyd (from Example 1)

210.0 parts of hydroxyethyl acrylate 580.0 parts of methyl methacrylate 50.4 parts of dimethylaminoethyl acrylate 5.88 parts of 2-mercaptoethanol 1.68 parts 5-butylperoctoate 50.0 parts VM&P 50 flash-naphtha Heat reaction mixture to 230° F. under nitrogen blanket with 210 rpm agitation (2000 inch/minute). Add the monomer/initiator mixture at a constant rate over 3 hrs period. Hold for 15 minutes and then add the following chaser charge over 3 hrs. period.

8.4 parts of Vazo-67

22.5 parts of xylene 4.2 parts of 5-butylperoctoate 22.5 parts of 50 flash-naphtha Hold for 1 hours at 230° F., then cool to 100° F. filter into 10 micron bags and packaged. The resultant NAD has the following characteristics: Brookfield Viscosity at 5&100 rpm with #4 spindle: 460 & 408 cps.; particle size (Malvern Zetasizer instrument): Dz=353 nm; %NVM=69.5; density= 8.37 lbs./gal.

EXAMPLE 4

Comparative Example Without Amine

To a clear and dry reactor (glass or stainless steel), equipped with mechanical stirrer, condensor, decanter, nitrogen inlet and outlet, heater and cooling devices, charge the following materials under nitrogen blanket:

265.0 parts of VM&P 50 flash-naphtha 160.0 parts of base alkyd (from Example 1)

Prepare the following charge in the monomer mix tank:

640.0 parts of base alkyd (from Example 1)

210.0 parts of hydroxyethyl acrylate 630.0 parts of methyl methacrylate
5.88 parts of 2-mercaptoethanol
1.68 parts t-butylperoctoate
50.0 parts VM&P 50 flash-naphtha Heat reaction mixture to 230° F. under nitrogen blanket with 210 rpm agitation (2000 inch/mint.). Add the monomer/initiator mixture at a constant rate over 3 hrs. period. Hold for 15 minutes and then add the following chaser charge over 3 hrs. period.

8.4 parts of Vazo-67
22.5 parts of xylene
4.2 parts of t-butylperoctoate
22.5 parts of 50 flash-naphtha Hold for 1 hours at 230° F., then cool to 100° F., filter into 10 micron bags and packaged. The resultant NAD has the following characteristics: Brookfield Viscosity at 5&100 rpm with #4 spindle: 340 & 450 cps.; particle size (Malvern Zetasizer instrument): Dz=597 nm; %NVM=69.5; density= 8.36 lbs./gal.

EXAMPLE 5

General Procedure for White Single Stage

A white acrylic grind is made using the following components:

| Part I | |
|---|---|
| NAD (Example 2) | 174.0 parts |
| Alkyd (Example 1) | 50.0 parts |
| Lecithin | 3.5 parts |
| Surfynol GA | 3.5 parts |
| TiO$_2$ - R960 | 251.0 parts |
| Mineral spirit | 10.0 parts |

After grinding with high speed disperser for 30 minutes, the grind was stabilized by the addition of the following components:

| Part II | |
|---|---|
| NAD (Example 2) | 326.0 parts |
| Mineral spirit | 45.0 parts |
| Dialkyl phthalate | 35.0 parts |
| methyl ethyl ketoxime | 1.8 parts |
| Ortho cresol | 1.8 parts |
| Tinuvin 292 | 3.5 parts |
| Tinuvin 384 | 3.5 parts |
| BYK-344 | 3.4 parts |
| Dibutyltin dilaurate | 0.7 parts |
| 50 Flash-Naphtha | 61.0 parts |

The resultant white paint was mixed with the following isocyanate solution:

| Part III | |
|---|---|
| Isocyanurate trimer[1] | 230.0 parts |
| Methyl n-amyl ketone | 140.0 parts |
| Mineral spirit | 16.0 parts |
| Exxtate 800 | 5.0 parts |

A commercially available drier composition from Western Automotive Finishes (W897:1 part per 100 parts of Parts I and II) was added. The resultant white enamel has a solid content of 61%, volatile organic content of 3.5 lbs./gal., a #4 Ford cup viscosity of 18 second. It was sprayed over a primed substrate, wet-on-wet (UPS-122: a commercial Western primer), and allowed to dry at room temperature for 4 weeks. The panel has the following properties: tack free time of 8.5 hours, 20 degree gloss of 86, Kohnig pendulum hardness of 86, solvent resistance rating of 9 out of 10, dry film thickness of 6.3 mils, and good adhesion and gloss retention upon exposure to the Cleveland humidity cabinet.

EXAMPLE 6

2.8 VOC 2K Sealer

A white TiO$_2$ grind is made using the following components:

| | |
|---|---|
| NAD (Example 2) | 68.0 parts |
| Alkyd (Example 1) | 14.0 parts |
| Lecithin | 1.38 parts |
| Surfynol GA | 1.38 parts |
| TiO$_2$ - R960 | 131.0 parts |
| Methyl Amyl Ketone | 8.46 parts |

After grinding with high speed disperser for 30 minutes, the following components were added:

| | |
|---|---|
| Drier (same as Ex. 5) | 12.4 parts |
| NAD (Example 2) | 234.0 parts |
| Mineral spirit | 31.0 parts |
| Black Toner (Example 7) | 85.2 parts |
| Ortho Cresol | 1.9 parts |
| Dibutyltin dilaurate | 0.4 parts |
| 50 Flash-Naphtha | 1.6 parts |

[1]70% isophoronediisocyanate in butyl acetate/Aromatic flash naphtha-100 at 1/2 wt ratio; Huls.

| | |
|---|---|
| Dilulin[2] | 87.0 parts |

[2]Linseed Oil modified with dicyclopentadiene (Cargill).

The resultant grey sealer was mixed with the following isocyanate solutions:

| | |
|---|---|
| Isocyanaurate trimer[3] | 112.0 parts |
| 50 Flash-Naphtha | 24.6 parts |
| Odorless Mineral Spirit | 31.0 parts |
| NAD (Example 2) | 55.0 parts |
| 50 Flash-Naphtha | 31.0 parts |

[3]70% isophoronediisocyanate in butyl acetate/Aromatic flash naphtha-100 at 1/2 ratio; Huls.

The resultant grey sealer had a solid content of 69%, volatile organic content of 2.8 lbs./gal., a #4 Ford cup viscosity of 17 second. It was sprayed over Bondrite 1000 substrate at dry film thickness of 1.2 mil and allowed to dry at room temperature. The panel had passed all tests: wet adhesion, KPH=84 (4 weeks), and short handslik time (15 minutes), and can be top-coated wet-on-wet.

EXAMPLE 7

3.5 VOC Black Acrylic Enamel

A black acrylic enamel is made by mixing the following components for 10 minutes in a turbine tank:

| Part I: | |
|---|---|
| NAD (Example 2) | 598.0 parts |

-continued

Part I:

| | |
|---|---|
| Alkyd (Example 1) | 63.0 parts |
| Lecithin | 4.4 parts |
| Surfynol GA | 2.2 parts |
| Lampblack dispersion[4] | 47.2 parts |
| Mineral spirit | 10.0 parts |

[4]Huls' dispersion 844-9955 (black pigment dispersed in thermoplastic acrylic resin and polyethylene oxide.

After mixing the following components with mixing: was stabilized by the addition of the following:

Part II:

| | |
|---|---|
| NAD (Example 2) | 31.0 parts |
| Mineral spirit | 25.0 parts |
| Methyl ethyl ketoxime | 2.2 parts |
| Ortho cresol | 2.2 parts |
| Tinuvin 292 | 4.4 parts |
| Tinuvin 384 | 4.4 parts |
| BYK-344 | 2.8 parts |
| Dibutyltin dilaurate | 0.6 parts |
| 50 Flash-Naphtha | 25.0 parts |

The resultant black toner was mixed with the following isocyanate solution:

| | |
|---|---|
| Isocyanurate trimer[5] | 230.0 parts |
| Methyl n-amyl ketone | 140.0 parts |
| Mineral spirit | 16.0 parts |
| Exxtate 800 | 5.0 parts |

[5]70% isophoronediisocyanate in butyl acetate/Aromatic flash naphtha-100 at 1/2 ratio; Huls.

A drier (same as Ex. 5: 1 part per 100 parts of Parts I and II) was added. The resultant black enamel has a volatile organic content of 3.5 lbs./gal.

EXAMPLE 8

3.5 VOC Quinacridone Violet Acrylic Enamel

A quinacridone violet acrylic enamel is made by mixing the following components for 10 minutes in a turbine tank:

Part I:

| | |
|---|---|
| NAD (Example 2) | 537.0 parts |
| Alkyd (Example 1) | 57.0 parts |
| Dialkyl Phthalate | 12.0 parts |
| Lecithin | 3.95 parts |
| Surfynol GA | 2.0 parts |
| Quinacridone dispersion[6] | 163.0 parts |

[6]Huls' dispersion No. 844-9451 (Quinacridone Violet pigment dispersed in thermoplastic acrylic resin and polyethylene oxide).

After mixing the following components are added:

Part II:

| | |
|---|---|
| NAD (Example 2) | 28.3 parts |
| Methyl ethyl ketoxime | 2.0 parts |
| Ortho cresol | 2.2 parts |
| Tinuvin 292 | 3.95 parts |
| Tinuvin 384 | 3.95 parts |
| BYK-344 | 2.86 parts |
| Dibutyltin dilaurate | 0.6 parts |

The resultant toner was mixed with the following isocyanate solution:

| | |
|---|---|
| Isocyanurate trimer[7] | 230.0 parts |
| Methyl n-amyl ketone | 140.0 parts |
| Mineral spirit | 16.0 parts |
| Exxtate 800 | 5.0 parts |

[7]70% isophoronediisocyanate in butyl acetate/Aromatic flash naphtha-100 at 1/2 ratio; Huls.

A drier (same as Ex. 5:1 part per 100 parts of Part I and Part II) was added. The resultant enamel is ready to spray and has a volatile organic content of 3.5 lbs./gal.

EXAMPLE 9

3.5 VOC Silver Metallic 2-K Acrylic Enamel

A ready to spray silver metallic acrylic enamel is made by mixing the following components for 10 minutes in a low speed mixer:

Part I:

| | |
|---|---|
| NAD (Example 2) | 75.0 parts |
| Lecithin | 4.0 parts |
| Surfynol GA | 2.0 parts |
| Mineral Spirit | 23.2 parts |
| 50 Flash-Naphtha | 13.8 parts |
| Sparkle silver[8] | 103.0 parts |

[8]Coarse aluminum paste from, Silverline-3641.

After mixing, the following components are added:

| | |
|---|---|
| Alkyd (Example 1) | 58.0 parts |
| Dialkyl Phthalate | 20.0 parts |
| Methyl ethyl ketoxime | 2.0 parts |
| Ortho cresol | 2.0 parts |
| Tinuvin 292 | 4.0 parts |
| Tinuvin 384 | 4.0 parts |
| BYK-344 | 3.0 parts |
| Dibutyltin dilaurate | 0.6 parts |
| 50 Flash-Naphtha | 23.2 parts |

The resultant silver metallic dispersion was mixed with the following isocyanate solution:

| | |
|---|---|
| Isocyanate trimer[9] | 230.0 parts |
| Methyl n-amyl ketone | 140.0 parts |
| Mineral spirit | 16.0 parts |
| Exxtate 800 | 5.0 parts |

[9]70% isophoronediisocyanate in butyl acetate/Aromatic flash naphtha-100 at 1/2 ratio; Huls.

A drier (same as Ex. 5:1 part per 100 parts of Parts I and II) was added. The resultant silver enamel is ready to spray and has a volatile organic content of 3.5 lbs./gal.

EXAMPLE 10

3.5 VOC 1-K Primer Sealer

A grey TiO$_2$ pre-grind was made in a high speed disperser using the following components:

| | |
|---|---|
| Mineral spirit | 18.0 parts |
| Alkyd (Example 1) | 75.0 parts |
| Lecithin | 4.18 parts |
| Surfynol GA | 4.18 parts |

| | |
|---|---|
| TiO₂ - Hitox Buff | 219.0 parts |
| Barium Metaborate | 14.0 parts |
| No. 6 super fine Lamp Black | 2.16 parts |

After grinding for 15 minutes at 6000 rpm, 18 parts mineral spirit was added to adjust the viscosity to 81 KU. The pre-grind was then passed through 250 ml Eiger continuous mill at 2200 rpm three times. The grind reading was 7/7 (Hegman gauge). The following let-down materials were added:

| | |
|---|---|
| Drier (same as Ex. 5) | 22.4 parts |
| NAD (Example 2) | 527.0 parts |
| Mineral spirit | 58.5 parts |
| BYK-344 | 4.1 parts |
| Ortho cresol | 1.9 parts |
| Methyl Ethyl Ketoxime | 1.9 parts |

The resultant grey sealer was mixed with the following solution:

| | |
|---|---|
| Alkyd (Example 1) | 107.4 parts |
| Mineral Spirit | 108.3 parts |
| NAD (Example 2) | 68.4 parts |
| 50 Flash-Naphtha | 69.6 parts |

The resultant grey sealer had a solid content of 58%, volatile organic content of 3.5 lbs./gal. Bondrite 1000 panels were treated with vinyl-wash primer (Sherwin-Williams commercial product-E2G 973), primed with the sealer of this Example and topcoated wet-on-wet with 3.5 VOC acrylic enamels of Examples 14 (white), 16 (black) and 18 (silver) and allowed to dry at room temperature. The white, black and silver panels had passed all tests: wet adhesion, Kohnig Pendulum Hardness=91, 91, 95 (4 weeks), respectively, 24 hours tape test and fair rating of 5 on the gravelometer.

EXAMPLE 11

3.5 VOC 1-K Basecoat

A low VOC one component basecoat (3.5 lb/gal VOC) was made by mixing the following components:

| | |
|---|---|
| NAD (Example 2) | 493.6 parts |
| Aluminum Paste | 143.0 parts |
| Drier* | 39.0 parts |
| 50 flash naphtha | 129.3 parts |

*Commercially available from The Sherwin-Williams Company under the tradename Kem Transport (V6V5).

The resultant silver basecoat had a viscosity of 18 seconds (#4 Ford), Hegman grind of 5.5, and sprayed over a primed panel. It had a hand-slik dry time of 15 minutes and could be clearcoated with acrylic urethane clear after 2 hours to give a basecoat/clearcoat finish with good gloss and appearance.

EXAMPLE 12

3.5 VOC 2-K Basecoat

A low VOC two component basecoat (3.5 lb/gal VOC) was made by mixing the following components using low speed mixer:

| | |
|---|---|
| NAD (Example 2) | 427.4 parts |
| Aluminum Paste | 144.25 parts |
| Drier (Example 11) | 39.0 parts |
| 50 flash naphtha | 125.0 parts |
| Isocyanurate trimer | 79.6 parts |

The resultant silver basecoat had a viscosity of 21 seconds (#4 Ford), Hegman grind of 5.5, and a potlife of 6 hours, and was sprayed over a primed panel. It had a hand slik dry time of 15 minutes and could be clearcoated with acrylic urethane clear after 2 hours to give a basecoat/clearcoat finish with good gloss and appearance.

What is claimed is:

1. In a substrate coated with a multilayer decorative and/or protective coating which comprises:
   a) a basecoat comprising a pigmented film-forming resin; and
   b) a clearcoat comprising a film-forming resin applied to the surface of the basecoat composition;
the improvement comprising utilizing as the basecoat composition a one-component, non-aqueous dispersion comprising a dispersion of a polymer in a non-polar hydrocarbon medium, wherein the polymer is produced by a free-radical addition polymerization reaction which takes place in the presence of an alkyd resin and wherein the polymer comprises at least one polar monomer and at least one amine-functional monomer.

2. The basecoat composition of claim 1 wherein the alkyd resin has a hydroxy value between about 10 and about 150, an Mn of between about 2000 and about 4000, a polydispersity less than 10, an acid value between about 5 to about 20, an oil length greater than about 30% but less than about 70% and viscosity measured at 25 degrees C., 70% solids by weight in 50-flash naphtha less than about 50 poise.

3. The basecoat composition of claim 2 wherein the alkyd resin is the two-step reaction product of a long chain oil with a multi functional alcohol followed by further reaction with an acid or arthydride.

4. The basecoat composition of claim 3 wherein the long chain oil is selected from the group consisting of linseed oil, soya oil, coconut oil, cottonseed oil, peanut oil, canola oil, corn oil, safflower oil, sunflower oil, dehydrated castor oil, tung oil, tall oil and mixtures thereof.

5. The basecoat composition of claim 4 wherein the long chain oil is selected from the group consisting of soya oil, dehydrated castor oil, linseed oil and mixtures thereof.

6. The basecoat composition of claim 5 wherein the multifunctional alcohol is selected from the group consisting of trimethylol propane, trimethylol ethane, glycerine, tris hydroxyethyl isocyanurate, pentaerythritol, dipentaerythritol, ethylene glycol, propylene glycol, cyclohexane dimethanol, dimethylol propionic acid, and mixtures thereof.

7. The basecoat composition of claim 6 wherein the acid or anhydride is selected from the group consisting of trimellitic acid or anhydride, isophthalic acid, terephthalic acid, trimesic acid, 1,3,5-pentane tricarboxylic acid, maleic anhydride, phthalic anhydride, citric acid, pyromelletic anhydride, and mixtures thereof.

8. The basecoat composition of claim 1 wherein the polymer produced by the free-radical addition reaction comprises monomers selected from the group consisting of acrylonitrile, methacrylonitrile, acrylic acid, methacrylic acid, itaconic acid, and esters of those acids, hydroxyethyl acrylate and methacrylate, hydroxypropyl acrylate and methacrylate, methyl acrylate and methacrylate, ethyl acrylate and methacrylate, butyl acrylate and methacrylate, lauryl acrylate and methacrylate, t-butyl methacrylate, isobornyl methacrylate, acrylamide, methacrylamide, vinyl chloride, vinylidene chloride, styrene, divinyl benzene, vinyl toluene, vinyle naphthalene, multifunctional epoxides, melamines and isocyanates, and mixtures thereof.

9. The basecoat composition of claim 8 wherein at least one of the monomers is a polar monomer selected from the group consisting of acrylonitrile, methacrylonitrile, acrylamide, methacrylamide, hydroxyethyl methacrylate, hydroxyethyl acrylate, hydroxypropyl acrylate, hydroxypropyl methacrylate, 4-hydroxy butyl acrylate, 4-hydroxy butyl methacrylate, polyethyleneoxide hydroxyethyl acrylate, adducts of hydroxyethyl acrylate and caprolactone, and mixtures thereof.

10. The basecoat composition of claim 9 wherein from about 2% to about 10% by weight of the monomers comprises an amine-functional monomer selected from the group consisting of dimethylaminoethyl acrylate, dimethylaminoethyl methacrylate, dimethylaminoethyl acrylamide, dimethylaminoethyl methacrylamide, n-t-butylaminoethyl acrylate, n-t-butylaminoethyl methacrylate, monomers resulting from the reaction of dialkyl amines with glycidyl methacrylate, and mixtures thereof.

11. The basecoat composition of claim 1 wherein the ratio of polymer to alkyd resin is from about 90:10 to about 10:90.

12. The basecoat composition of claim 11 wherein the ratio of polymer to alkyd resin is about 60:40.

13. In a substrate coated with a multilayer decorative and/or protective coating which comprises:
   a) a basecoat comprising a pigmented film-forming resin; and
   b) a clearcoat comprising a film-forming resin applied to the surface of the basecoat composition;
the improvement comprising utilizing as the basecoat composition a two-component, non-aqueous dispersion comprising:
   i) a first component comprising an isocyanate-functional material, and
   ii) a second component comprising a non-aqueous dispersion comprising a dispersion of a polymer in a non-polar hydrocarbon medium, wherein the polymer is produced by a free-radical addition polymerization reaction which takes place in the presence of an alkyd resin and wherein the polymer comprises at least one polar monomer and at least one amine-functional monomer;
wherein upon combining the first component with the second component results in the reaction of the isocyanate-functional material with the non-aqueous dispersion.

14. The coating of claim 13 wherein the alkyd resin has a hydroxy value between about 10 and about 150, an Mn of between about 2000 and about 4000, a polydispersity less than 10, an acid value between about 5 to about 20, an oil length greater than about 30% but less than about 70% and viscosity measured at 25 degrees C., 70% solids by weight in 50-flash naphtha less than about 50 poise.

15. The coating of claim 14 wherein the alkyd resin is the two-step reaction product of a long chain oil with a multifunctional alcohol followed by further reaction with an acid or anhydride.

16. The coating of claim 15 wherein the long chain oil is selected from the group consisting of linseed oil, soya oil, coconut oil, cottonseed oil, peanut oil, canola oil, corn oil, safflower oil, sunflower oil, dehydrated castor oil, tung oil, tall oil and mixtures thereof.

17. The coating of claim 16 wherein the long chain oil is selected from the group consisting of soya oil, dehydrated castor oil, linseed oil and mixtures thereof.

18. The coating of claim 17 wherein the multifunctional alcohol is selected from the group consisting of trimethylol propane, trimethylol ethane, glycerine, tris hydroxyethyl isocyanurate, pentaerythritol, dipentaerythritol, ethylene glycol, propylene glycol, cyclohexane dimethanol, dimethylol propionic acid, and mixtures thereof.

19. The coating of claim 18 wherein the acid or anhydride is selected from the group consisting of trimelletic acid or anhydride, isophthalic acid, terephthalic acid, trimesic acid, 1,3,5-pentane tricarboxylic acid, maleic anhydride, phthalic anhydride, citric acid, pyromelletic anhydride, and mixtures thereof.

20. The coating of claim 13 wherein the free-radical addition polymer comprises monomers selected from the group consisting of acrylonitrile, methacrylonitrile, acrylic acid, methacrylic acid, itaconic acid, and esters of those acids, hydroxyethyl acrylate and methacrylate, hydroxypropyl acrylate and methacrylate, methyl acrylate and methacrylate, ethyl acrylate and methacrylate, butyl acrylate and methacrylate, lauryl acrylate and methacrylate, t-butyl methacrylate, isobornyl methacrylate, acrylamide, methacrylamide, vinyl chloride, vinylidene chloride, styrene, divinyl benzene, vinyl toluene, vinyle naphthalene, multifunctional epoxides, melamines and isocyanates, and mixtures thereof.

21. The coating of claim 20 wherein at least one of the free-radical addition monomers is a polar monomer selected from the group consisting of acrylonitrile, methacrylonitrile, acrylamide, methacrylamide, hydroxyethyl methacrylate, hydroxyethyl acrylate, hydroxypropyl acrylate, hydroxypropyl methacrylate, 4-hydroxy butyl acrylate, 4-hydroxy butyl methacrylate, polyethyleneoxide hydroxyethyl acrylate, adducts of hydroxyethyl acrylate and caprolactone, and mixtures thereof.

22. The coating of claim 21 wherein from about 2% to about 10% by weight of the monomers comprise an amine-functional monomer selected from the group consisting of dimethylaminoethyl acrylate, dimethylaminoethyl methacrylate, dimethylaminoethyl acrylamide, dimethylaminoethyl methacrylamide, n-t-butylaminoethyl acrylate, n-t-butylaminoethyl methacrylate, monomers resulting from the reaction of dialkyl amines with glycidyl methacrylate, and mixtures thereof.

23. The coating of claim 13 wherein the ratio of polymer to alkyd resin is from about 90:10 to about 10:90.

24. The coating of claim 23 wherein the ratio of polymer to alkyd resin is about 60:40.

25. The coating of claim 13 wherein the first component comprises an isocyanate-functional material selected from the group consisting of isocyanurate trimers and dimers, biurets, and allophanates of trimethylene diisocyanate; tetramethylene diisocyanate; pentamethylene diisocyanate; hexamethylene diisocyanate; ethylethylene diisocyanate; 2,3-dimethylethylene diisocyanate; 1-methyltrimethylene diisocyanate; 1,3-cylcopentylene diisocyanate; 1,4-cyclohexylene diisocyanate; 1,2-cyclohexylene diisocyanate; 1,3-phenylene diisocyanate; 1,4-phenylene diisocyanate; 2,4-toluylene diisocyanate; 2,6-toluylene diisocyanate; 4,4'-biphenylene diisocyanate; 1,5-naphthylene diisocyanate; 1,4-naphthylene diisocyanate; 1-isocyanatomethyl-5-isocyanato-1,3,3-trimethylcyclohexane; bis-(4-isocyanato-cyclohexyl)-methane; bis-(4-isocyanato-phenyl)-methane; 4,4'-diisocyanatodiphenyl ether; 2,3-bis-(8-isocyanatooctyl)-4-octyl-5-hexylcyclohexane; isophorone diisocyanate; benzene-1,3-bis (1-isocyanato-1-methylethyl)); and mixtures thereof.

26. The coating of claim 25 wherein the isocyanate-functional material comprises an isocyanurate trimer of an isophorone diisocyanate.

* * * * *